(12) United States Patent
Singh et al.

(10) Patent No.: US 9,622,285 B2
(45) Date of Patent: Apr. 11, 2017

(54) METHODS AND APPARATUS FOR MOBILE DEVICE RECOVERY FOLLOWING RADIO LINK FAILURE

(71) Applicant: BlackBerry Limited, Waterloo (CA)

(72) Inventors: Ajay Singh, Sammamish, WA (US); Anup Vijay, Wednesbury (GB); Andrew John Farnsworth, Kidderminster (GB); Gordon Peter Young, Shipston-on-Stour (GB)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 15/012,112

(22) Filed: Feb. 1, 2016

(65) Prior Publication Data

US 2016/0165655 A1 Jun. 9, 2016

Related U.S. Application Data

(63) Continuation of application No. 13/745,517, filed on Jan. 18, 2013, now Pat. No. 9,253,667.

(60) Provisional application No. 61/699,246, filed on Sep. 10, 2012.

(51) Int. Cl.
*H04W 76/04* (2009.01)
*H04W 24/04* (2009.01)
*H04W 76/06* (2009.01)
*H04W 76/02* (2009.01)

(52) U.S. Cl.
CPC ......... *H04W 76/045* (2013.01); *H04W 24/04* (2013.01); *H04W 76/068* (2013.01); *H04W 76/028* (2013.01)

(58) Field of Classification Search
CPC .................................................. H04W 24/04
USPC ............................................................. 370/326
See application file for complete search history.

(56) References Cited

U.S. PATENT DOCUMENTS

| | | | |
|---|---|---|---|
| 5,675,629 A | 10/1997 | Raffel et al. |
| 7,075,897 B2 | 7/2006 | Uematsu |
| 7,260,066 B2 | 8/2007 | Wang et al. |
| 7,280,898 B2 | 10/2007 | Lesesky et al. |
| 7,599,623 B2 | 10/2009 | Stock et al. |
| 7,835,265 B2 | 11/2010 | Wang et al. |
| 2005/0054298 A1 | 3/2005 | Chen |
| 2006/0190654 A1 | 8/2006 | Joy et al. |

(Continued)

OTHER PUBLICATIONS

3GPP TS 25.331 version 10.3.1 Release 10, May 2011.
(Continued)

*Primary Examiner* — Melvin Marcelo
*Assistant Examiner* — Peter G Solinsky
(74) *Attorney, Agent, or Firm* — Fish & Richardson P.C.

(57) ABSTRACT

Methods and apparatus to audibly provide messages in a mobile device at described. An example method includes detecting a radio link failure condition, in response to detecting the radio link failure condition, sending a cell update message to a medium access control of the user equipment, detecting that a timer associated with a radio access bearer has expired before receiving confirmation from the medium access control of transmission of the cell update message to a network, and in response to detecting that the timer associated with the radio access bearer has expired and sending the cell update message to the medium access control, maintaining the radio access bearer associated with the timer.

12 Claims, 8 Drawing Sheets

(56) References Cited

U.S. PATENT DOCUMENTS

| | | | |
|---|---|---|---|
| 2007/0140199 A1* | 6/2007 | Zhao | H04W 52/0229 |
| | | | 370/338 |
| 2009/0168728 A1 | 7/2009 | Pani et al. | |
| 2009/0196167 A1* | 8/2009 | Hu | H04W 76/046 |
| | | | 370/216 |
| 2010/0223650 A1 | 9/2010 | Millet et al. | |
| 2010/0327886 A1 | 12/2010 | Nakamura et al. | |
| 2010/0330993 A1 | 12/2010 | Kone | |
| 2011/0019532 A1 | 1/2011 | Jung et al. | |
| 2011/0021154 A1* | 1/2011 | Marinier | H04W 72/02 |
| | | | 455/67.11 |
| 2011/0077010 A1 | 3/2011 | Xu et al. | |
| 2012/0092983 A1 | 4/2012 | Song | |
| 2012/0182912 A1* | 7/2012 | Watfa | H04W 36/0022 |
| | | | 370/311 |
| 2012/0275316 A1 | 11/2012 | Wang | |
| 2013/0150014 A1 | 6/2013 | Gong et al. | |
| 2014/0003354 A1 | 1/2014 | Ekici et al. | |
| 2014/0177468 A1 | 6/2014 | Kazmi et al. | |
| 2014/0235232 A1 | 8/2014 | Lee et al. | |
| 2015/0011216 A1 | 1/2015 | Jung et al. | |

OTHER PUBLICATIONS

European Patent Office, "Extended European Search Report," issued in connection with application No. EP 13161015.6, on Jan. 29, 2014, 9 pages.

Research in Motion UK Limited, "Ambiguity in releasing all RABs associated to a single CN domain," 3GPP Draft; R2-101434, 3rd Generation Partnership Project (3GPP), Mobile Competence Centre, Route Des Lucioules, IP.SJ 2 Sophia-Antipolis Cedex, France, RAN WG2, San Francisco, USA, Feb. 22-26, 2010, 18 pages.

Renesas Mobile Europe Ltd et al., "Cell update-less RCL unrecoverable error reporting and recovery," 3GPP Draft; R2-123858, 3rd Generation Partnership Project (3GPP), Mobile Competence Centre, RAN WG2, Qingdao, IP.SJ 3 China, Aug. 13-17, 2012, 6 pages.

\* cited by examiner

METHODS AND APPARATUS FOR MOBILE DEVICE RECOVERY FOLLOWING RADIO LINK FAILURE

CROSS-REFERENCE TO RELATED APPLICATION

This application is a continuation of U.S. patent application Ser. No. 13/745,517 filed on Jan. 18, 2013, which claims priority to U.S. Provisional Application No. 61/699,246 filed on Sep. 10, 2012, the entire contents of which is hereby incorporated by reference for all purposes.

BACKGROUND

| Acronym | Full text |
|---|---|
| CS | Circuit Switched |
| DCH | Dedicated Channel |
| IE | information element |
| MAC | Medium Access Control |
| NAS | Non-access stratum |
| PS | Packet Switched |
| RB | Radio Bearer |
| RAB | Radio Access Bearer |
| RNC | Radio Network Controller |
| RRC | Radio Resource Control |
| SRB | Signalling Radio Bearer |
| TrCh | Transport Channel |
| UE | User Equipment |
| UMTS | Universal Mobile Telephony System |
| UTRAN | Universal Terrestrial Radio Access Network |

Mobile device operating software includes several timers utilized in communication with a network (e.g., a UMTS network). For example, according to 3GPP TS 25.331, for a UMTS UE, two of the many timers used by the UE are re-establishment timers T314 and T315. After a radio link failure between the UE and the network, one of the T314 or T315 timers may be associated to each RAB for use during RRC re-establishment. The T314 timer is started when the criteria for radio link failure are fulfilled and if radio bearer(s) that are associated with T314 exist or if the signalling connection exists only to the CS domain. The timer T315 is started when the criteria for radio link failure are fulfilled and if radio bearer(s) that are associated with T315 exist or if the signalling connection exists to the PS domain.

BRIEF DESCRIPTION OF THE DRAWINGS

For a better understanding of the various implementations described herein and to show more clearly how they may be carried into effect, reference will now be made, by way of example only, to the accompanying drawings which show at least one example implementation and in which.

DETAILED DESCRIPTION

Re-establishment of an RRC connection is triggered when a user equipment (UE) (also referred to as a mobile device herein) detects a radio link failure. For example, the UE may re-establish the RRC connection according to 3GPP TS 25.331 as follows:

1. When Radio Link Failure is detected (e.g., according to TS25.331 section 8.5.6) the UE starts a cell update procedure (e.g., according to TS25.331 section 8.3.1). In this scenario the CELL UPDATE procedure triggers the UE to transmit a message to the network notifying the network of the radio link failure.

2. One or more re-establishment timers (e.g., the T314 timer or the T315 timer) are started.

3. Substantially simultaneously with 2, the CELL UPDATE message (e.g., including T314 (T315) expiry flag in IE "RB Timer indicator" set to FALSE) is compiled by the RRC layer of the UE and submitted to MAC layer of the UE.

4. The MAC layer confirms to the upper (RRC) layer within the UE that transmission of the CELL UPDATE message is completed successfully or has failed.

5. RRC layer starts a CELL UPDATE timer (e.g., the CELL UPDATE T302 timer) and awaits the response message from the network (e.g. a cell update confirmation message such as CELL UPDATE CONFIRM).

Behavior of the UE upon expiry of the timer T314 is as described in TS 25.331 section 8.3.1.13 (or expiry of the timer T315 described in TS 25.331 section 8.3.1.14) and typically has 3 considerations:

1. If the T302 timer is running, do nothing until a response message (e.g., in response to the CELL UPDATE message) is received.

2. If the T302 timer is not running but associated reestablishment timer T315 is running, release RBs/signalling connection associated with T314, inform the higher layers within the UE of this action.

3. if the T302 timer and the T315 timer are not running, release all RBs/signalling connection and go to IDLE.

During re-establishment of an RRC connection between a UE and a network, there may be substantial time while certain timers are not running. For example, in the time period between when the compilation of a CELL UPDATE message is completed and the time that the MAC layer confirmation transmission status message is received by the RRC layer, the T302 timer is not running. Accordingly, the UE will perform either step 2 or step 3 above when the T314 or the T315 timers expire. However, because the CELL UPDATE message has already been compiled, the CELL UPDATE message will not include an indication of the expiration of the T314 and/or the T315 timers (e.g., the CELL UPDATE message will not include the IE "RB Timer indicator" with a value of TRUE for the timers).

During the RRC re-establishment procedure (when no timers T302/T314/T315 have expired) the CELL UPDATE CONFIRM message contains the RRC parameters to enable the UE to re-establish the call. On successful processing of the CELL UPDATE CONFIRM message according to TS25.331 section 8.3.1.6, a response message is sent to the UTRAN as described in TS25.331 section 8.3.1.7. This is an RRC reconfiguration complete message, such as a TRANSPORT CHANNEL RECONFIGURATION COMPLETE message.

In the case of, for example, step 2 above when the T302 timer is not running but associated reestablishment timer T315 is running, the UE may release one or more RBs/signalling connections. However, the network may not be notified of the release and will consider that the RBs/signalling connections are still active. Such a condition results in desynchronization between the UE and the network regarding which RBs/signalling connections are held by the UE. The network may respond to the UE in a way that is not consistent with the current state of the UE. For example, the network may respond to the CELL UPDATE sent by the UE by trying to reestablish a call using RABs that have already been released.

Methods and apparatus disclosed herein facilitate mobile device recovery following radio link failure. Some examples address how the UE behaves when the UE has released RBs/signalling connections associated with a timer (e.g., the T314 timer or the T315 timer) and the UE detects that the network and the UE are out of synchronization. For example, the UE may be aware that the network has not been notified of the release of RBs/signalling connections (e.g., when the CELL UPDATE message is compiled before the expiration of the T314 or the T315 timer).

In other instances, the UE may detect that, despite a notification that the timers have expired (e.g., via the IE "RB Timer indicator" in the CELL UPDATE message), the network has sent a request to the UE to re-establish a call on terminated RBs/signalling connections (e.g., via a CELL UPDATE CONFIRM message). The UE may detect that the network is attempting to re-establish a call by determining that a CELL UPDATE CONFIRM message does not release transport channels and sets the target state of reconfiguration as CELL_DCH. For example, initially three UL and DL DCH TrCHs (uplink and downlink transport channels mapped to dedicated channels) were in use for CS calls prior to a UE detecting a Radio Link Failure. If as a result of the Radio Link Failure the subsequently received CELL UPDATE CONFIRM message does not release the three UL and DL DCH TrCHs and the IE "RRC State Indicator" is set to CELL_DCH then the UE may determine that the T314 timer expiry has not been acted on by the UTRAN (e.g., despite the UE notifying the network of the expiry).

In another example, the UE may detect that the network is trying to re-establish a call by waiting for data on TrCHs that are not mapped to a Radio Bearer (RB) in a received CELL UPDATE CONFIRM message. Typically, in the case of RRC re-establishment, the UTRAN will try to restart the transfer of user plane traffic as soon as re-establishment is complete. It may be allowable for a UTRAN to leave unused TrCHs configured. However, if the network starts sending data on them without a mapped RB, then the UE may determine that the UTRAN and UE are out of sync regarding the UE's configuration.

Once the UE determines that the UE and the network are out of sync, example methods and apparatus described herein facilitate re-synchronization of the UE state and the network. Additionally or alternatively, some methods and apparatus described herein facilitate a response to radio link failure wherein the UE does not release the RBs/signalling connections to prevent the loss of synchronization between the UE and the network.

Figure 1:
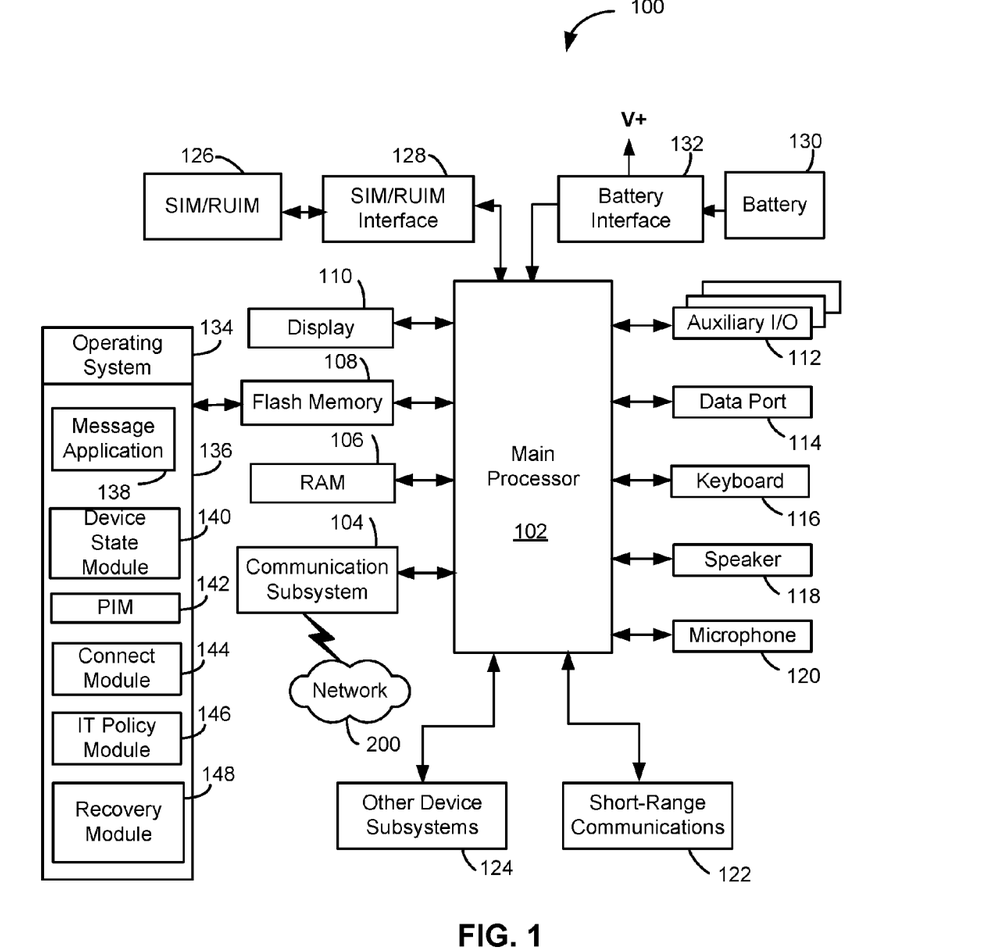
FIG. 1 is a block diagram of an example implementation of a mobile device.

Referring first to FIG. 1, shown therein is a block diagram of an example implementation of a mobile device 100. The mobile device 100 includes a number of components such as a main processor 102 that controls the overall operation of the mobile device 100. Communication functions, including data and voice communications, are performed through a communication subsystem 104. The communication subsystem 104 receives messages from and sends messages to a wireless network 200. In this example implementation of the mobile device 100, the communication subsystem 104 is configured in accordance with the UMTS. Alternatively, any other type of network service may be utilized (e.g., Global System for Mobile Communication (GSM) and General Packet Radio Services (GPRS) standards, Enhanced Data GSM Environment (EDGE), and so forth). New standards are still being defined, but it is believed that they will have similarities to the network behavior described herein, and it will also be understood by persons skilled in the art that the implementations described herein are intended to use any other suitable standards that are developed in the future. The wireless link connecting the communication subsystem 104 with the wireless network represents one or more different Radio Frequency (RF) channels, operating according to defined protocols specified for UMTS communications. These channels may support both circuit switched communications and packet switched communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, short-range communications 122 and other device subsystems 124.

Some of the subsystems of the mobile device 100 perform communication-related functions, whereas other subsystems may provide "resident" or on-device functions. By way of example, the display 110 and the keyboard 116 may be used for both communication-related functions, such as entering a text message for transmission over the network 200, and device-resident functions such as a calculator or task list.

The mobile device 100 can send and receive communication signals over the wireless network 200 after required network registration or activation procedures have been completed. Network access is associated with a subscriber or user of the mobile device 100. To identify a subscriber, the mobile device 100 requires a SIM/RUIM card 126 (i.e. Subscriber Identity Module or a Removable User Identity Module) to be inserted into a SIM/RUIM interface 128 in order to communicate with a network. The SIM card or RUIM 126 is one type of a conventional "smart card" that can be used to identify a subscriber of the mobile device 100 and to personalize the mobile device 100, among other things. Without the SIM card 126, the mobile device 100 is not fully operational for communication with the wireless network. By inserting the SIM card/RUIM 126 into the SIM/RUIM interface 128, a subscriber can access all subscribed services. Services may include: web browsing and messaging such as e-mail, voice mail, Short Message Service (SMS), and Multimedia Messaging Services (MMS). More advanced services may include: point of sale, field service and sales force automation. The SIM card/RUIM 126 includes a processor and memory for storing information. Once the SIM card/RUIM 126 is inserted into the SIM/RUIM interface 128, it is coupled to the main processor 102. In order to identify the subscriber, the SIM card/RUIM 126 can include some user parameters such as an International Mobile Subscriber Identity (IMSI). An advantage of using the SIM card/RUIM 126 is that a subscriber is not necessarily bound by any single physical mobile device. The SIM card/RUIM 126 may store additional subscriber information for a mobile device as well, including datebook (or calendar) information and recent call information. Alternatively, user identification information can also be programmed into the flash memory 108.

The mobile device 100 is typically a battery-powered device and includes a battery interface 132 for receiving one or more rechargeable batteries 130. In at least some implementations, the battery 130 can be a smart battery with an embedded microprocessor. The battery interface 132 is coupled to a regulator (not shown), which assists the battery 130 in providing power V+ to the mobile device 100.

Although current technology makes use of a battery, future technologies such as micro fuel cells may provide the power to the mobile device 100.

The mobile device 100 also includes an operating system 134 and software components 136 to 148 which are described in more detail below. The operating system 134 and the software components 136 to 148 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 148, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, will normally be installed on the mobile device 100 during its manufacture. Other software applications include a message application 138 that can be any suitable software program that allows a user of the mobile device 100 to send and receive electronic messages. Various alternatives exist for the message application 138 as is well known to those skilled in the art. Messages that have been sent or received by the user are typically stored in the flash memory 108 of the mobile device 100 or some other suitable storage element in the mobile device 100. In at least some implementations, some of the sent and received messages may be stored remotely from the device 100 such as in a data store of an associated host system that the mobile device 100 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 100 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network. PIM data items may be seamlessly integrated, synchronized, and updated via the wireless network with the mobile device subscriber's corresponding data items stored and/or associated with a host computer system. This functionality creates a mirrored host computer on the mobile device 100 with respect to such items. This can be particularly advantageous when the host computer system is the mobile device subscriber's office computer system.

The mobile device 100 also includes a connect module 144, and an IT policy module 146. The connect module 144 implements the communication protocols that are required for the mobile device 100 to communicate with the wireless infrastructure and any host system, such as an enterprise system, that the mobile device 100 is authorized to interface with. Examples of a wireless infrastructure and an enterprise system are given in FIGS. 3 and 4, which are described in more detail below.

The connect module 144 includes a set of APIs that can be integrated with the mobile device 100 to allow the mobile device 100 to use any number of services associated with the enterprise system. The connect module 144 allows the mobile device 100 to establish an end-to-end secure, authenticated communication pipe with the host system. A subset of applications for which access is provided by the connect module 144 can be used to pass IT policy commands from the host system to the mobile device 100. This can be done in a wireless or wired manner. These instructions can then be passed to the IT policy module 146 to modify the configuration of the device 100. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 108 in its native form. After the IT policy data is stored, a global notification can be sent by the IT policy module 146 to all of the applications residing on the mobile device 100. Applications for which the IT policy may be applicable then respond by reading the IT policy data to look for IT policy rules that are applicable.

The IT policy module 146 can include a parser (not shown), which can be used by the applications to read the IT policy rules. In some cases, another module or application can provide the parser. Grouped IT policy rules, described in more detail below, are retrieved as byte streams, which are then sent (recursively, in a sense) into the parser to determine the values of each IT policy rule defined within the grouped IT policy rule. In at least some implementations, the IT policy module 146 can determine which applications are affected by the IT policy data and send a notification to only those applications. In either of these cases, for applications that aren't running at the time of the notification, the applications can call the parser or the IT policy module 146 when they are executed to determine if there are any relevant IT policy rules in the newly received IT policy data.

All applications that support rules in the IT Policy are coded to know the type of data to expect. For example, the value that is set for the "WEP User Name" IT policy rule is known to be a string; therefore the value in the IT policy data that corresponds to this rule is interpreted as a string. As another example, the setting for the "Set Maximum Password Attempts" IT policy rule is known to be an integer, and therefore the value in the IT policy data that corresponds to this rule is interpreted as such.

After the IT policy rules have been applied to the applicable applications or configuration files, the IT policy module 146 sends an acknowledgement back to the host system to indicate that the IT policy data was received and successfully applied.

The mobile device 100 also includes a recovery module 148. As described in conjunction with the remaining figures, the recovery module 148 facilitates recovery by the UE from a radio link failure. The example recovery module 148 may control the various layers of the UE (e.g., the MAC layer, the RRC layer, the NAS, etc.) to facilitate recovery. While a single recovery module 148 illustrated, the recovery module may comprise multiple components and/or may be integrated with other components.

Other types of software applications can also be installed on the mobile device 100. These software applications can be third party applications, which are added after the manufacture of the mobile device 100. Examples of third party applications include games, calculators, utilities, etc.

The additional applications can be loaded onto the mobile device 100 through at least one of the wireless network, the auxiliary I/O subsystem 112, the data port 114, the short-range communications subsystem 122, or any other suitable device subsystem 124. This flexibility in application installation increases the functionality of the mobile device 100 and may provide enhanced on-device functions, communication-related functions, or both. For example, secure communication applications may enable electronic commerce functions and other such financial transactions to be performed using the mobile device 100.

The data port 114 enables a subscriber to set preferences through an external device or software application and extends the capabilities of the mobile device 100 by providing for information or software downloads to the mobile device 100 other than through a wireless communication network. The alternate download path may, for example, be used to load an encryption key onto the mobile device 100 through a direct and thus reliable and trusted connection to provide secure device communication.

The data port 114 can be any suitable port that enables data communication between the mobile device 100 and another computing device. The data port 114 can be a serial or a parallel port. In some instances, the data port 114 can be a USB port that includes data lines for data transfer and a supply line that can provide a charging current to charge the battery 130 of the mobile device 100.

The short-range communications subsystem 122 provides for communication between the mobile device 100 and different systems or devices, without the use of the wireless network. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download will be processed by the communication subsystem 104 and input to the main processor 102. The main processor 102 will then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, an optical navigation control or trackpad, or a roller wheel with dynamic button pressing capability. The keyboard 116 is preferably an alphanumeric keyboard and/or telephone-type keypad. However, other types of keyboards may also be used. A composed item may be transmitted over the wireless network through the communication subsystem 104.

For voice communications, the overall operation of the mobile device 100 is substantially similar, except that the received signals are output to the speaker 118, and signals for transmission are generated by the microphone 120. Alternative voice or audio I/O subsystems, such as a voice message recording subsystem, can also be implemented on the mobile device 100. Although voice or audio signal output is accomplished primarily through the speaker 118, the display 110 can also be used to provide additional information such as the identity of a calling party, duration of a voice call, or other voice call related information.

While an example manner of implementing the mobile device 100 including the recovery module 148 is illustrated in FIG. 1, one or more of the elements, processes and/or devices illustrated in FIG. 1 may be combined, divided, re-arranged, omitted, eliminated and/or implemented in any other way. Further, the illustrated components (including the recovery module 148) of the mobile device 100 may be implemented by hardware, software, firmware and/or any combination of hardware, software and/or firmware. Thus, the components of the mobile device 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the components are hereby expressly defined to include a computer readable medium such as a memory, DVD, CD, etc. storing the software and/or firmware.

Flowcharts and message diagrams of example processes for implementing the recovery module 148 of FIG. 1 are shown in FIGS. 2-11. The example processes may be implemented by machine readable instructions comprising a program for execution by a processor such as the main processor 102 of FIG. 1. The machine readable instructions may be embodied in software stored on a computer readable medium such as a CD, a floppy disk, a hard drive, a DVD, Blu-ray disc, or a memory associated with the main processor 102, but the entire set of machine readable instructions and/or parts thereof could alternatively be executed by a device other than the main processor 102 and/or embodied in firmware or dedicated hardware. Further, although the example processes are described with reference to the flowchart illustrated in FIGS. 2-11, many other methods of implementing the example recovery module 148 may alternatively be used. For example, the order of execution of the blocks may be changed, and/or some of the blocks described may be changed, eliminated, or combined.

As mentioned above, the example processes of FIGS. 2-11 may be implemented using coded instructions (e.g., computer readable instructions) stored on a tangible computer readable medium such as a hard disk drive, a flash memory, a ROM, a CD, a DVD, a Blu-ray disc, a cache, a RAM and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIG. 3-5 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Figure 2:
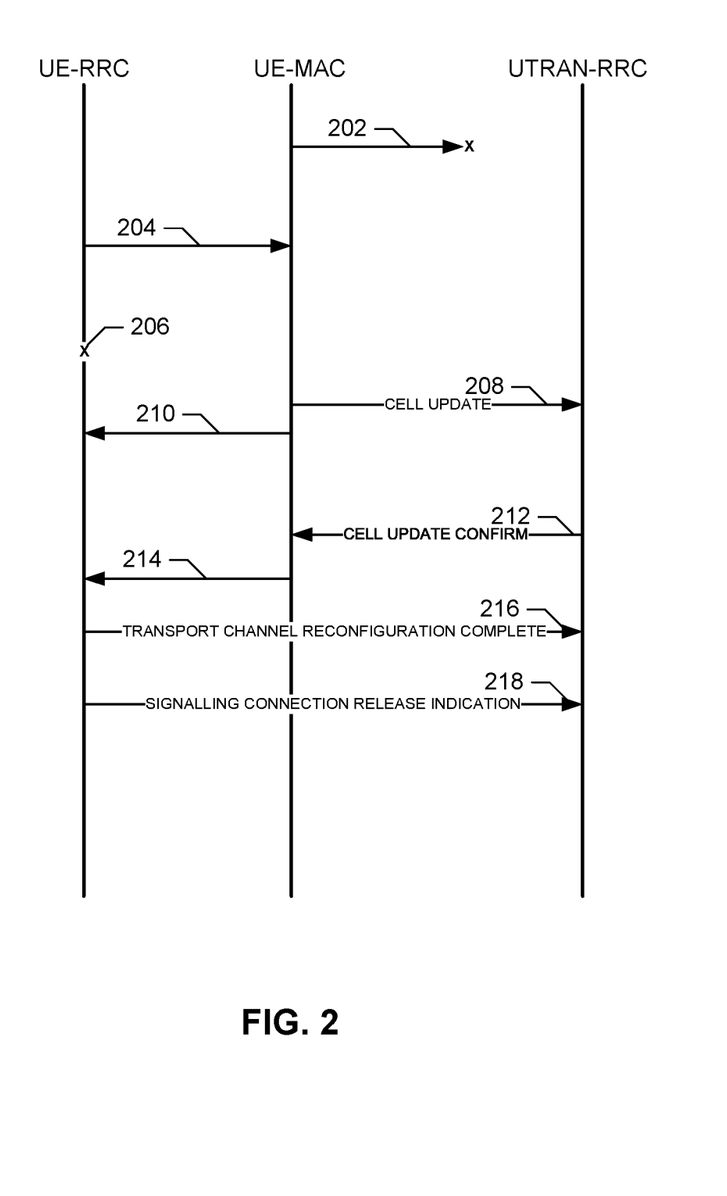
FIGS. 2, 4, 6, 8, and 10 are message diagrams illustrating example processes to recover from radio link failure.

FIG. 2 is a message diagram illustrating an example process to recover from radio link failure. The message diagram begins when a radio link failure is detected when the MAC of the UE transmits message 202. For example, the radio link failure may be detected in accordance with 3GPP TS 25.331 section 8.5.6. The UE then initiates a CELL UPDATE procedure. For example, the UE may initiate a CELL UPDATE procedure as described in 3GPP TS 25.331 section 8.3.1. Initiation of the CELL UPDATE procedure may trigger the start of the T314. While the T314 timer is referenced in conjunction with FIG. 2, the T315 timer may additionally or alternatively be utilized.

When compilation of the CELL UPDATE message has completed, the RRC of the UE transmits 204 the CELL UPDATE message to the MAC for transmission to the network (e.g., UTRAN in the illustrated example). According to the illustrated example, at 206 the T314 timer expires and the UE releases all RBs/signalling connections associated with the T314 timer. Meanwhile, the MAC of the UE transmits 208 the CELL UPDATE to the UTRAN. In response to the transmission 208, the MAC indicates 210 to the RRC the successful transmission of the CELL UPDATE message. In response to the indication 210, the RRC starts the T302 timer.

In response to the CELL UPDATE, the network transmits 212 a CELL UPDATE CONFIRM message to the MAC of the UE. The MAC transmits 214 the CELL UPDATE CONFIRM to the RRC. The recovery module 148 of the UE examines the contents of the CELL UPDATE CONFIRM message. In response to detecting that the UTRAN is trying to re-establish a call and that the contents of the CELL UPDATE CONFIRM are not sufficient to enable the UE to re-establish the call (e.g., because there are no transport channel mappings in the message), the UE performs the following:

The UE transmits 216 an RRC Reconfiguration Complete message (e.g., a TRANSPORT CHANNEL RECONFIGURATION COMPLETE message in the illustrated example) to the UTRAN. The UE then transmits 218 a SIGNALLING CONNECTION RELEASE INDICATION (SCRI) message to the UTRAN (e.g., the SCRI may be immediately transmitted after the TRANSPORT CHANNEL RECONFIGURATION COMPLETE message). The SCRI may include an indication of the Core Network (CN) domain for which the UE has locally released the signaling connection. Thus, the UTRAN is notified that the UE has released the signaling connection associated with the T314 timer. The UTRAN can then take appropriate action to re-synchronize the UE and UTRAN and possibly re-establish a connection (e.g., the UTRAN may restart the RBs/signaling connections).

While the illustrated example indicates that the transmission 216 is a TRANSPORT CHANNEL RECONFIGURATION COMPLETE message, other messages could be transmitted. For example, the transmission 216 could be a RADIO BEARER SETUP COMPLETE message, a RADIO BEARER RECONFIGURATION COMPLETE message, a RADIO BEARER RELEASE COMPLETE, a PHYSICAL CHANNEL RECONFIGURATION COMPLETE message, etc. Furthermore, in some examples the SCRI may include a relevant cause value. For example, the SCRI may include a cause value of "any other cause".

Figure 3:
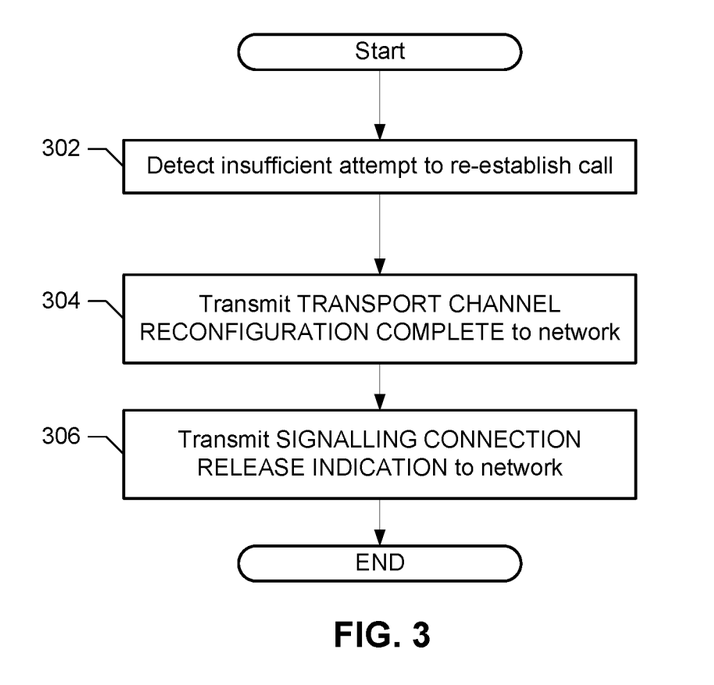
FIGS. 3, 5, 7, 9, and 11 are flowcharts of example instructions to implement the recovery module of FIG. 1 to recover a connection.

FIG. 3 is a flowchart of example instructions to implement the recovery module 148 to recover a connection in accordance with the message diagram of FIG. 2. The example process begins when the recovery module 148 detects an insufficient attempt to re-establish a call (block 302). For example, the detection may be performed following the transmissions 202-214 in FIG. 2 by examining the contents of a cell update confirmation message (e.g., CELL UPDATE CONFIRM message) as described in conjunction with FIG. 2.

The recovery module 148 then causes the UE to transmit a RRC Reconfiguration complete message, such as the TRANSPORT CHANNEL RECONFIGURATION COMPLETE message illustrated in FIG. 2 (block 304). Then, the recovery module 148 causes the UE to transmit a SIGNALLING CONNECTION RELEASE INDICATION message indicating radio bearers that have been previously released (block 306). For example, the SCRI may be transmitted in response to the UE receiving an RLC acknowledgment from the network for the delivery of the RRC Reconfiguration complete message. The process of FIG. 2 then ends. For example, any process for re-establishing a call after RBs/signalling connections have been released may be used.

Figure 4:
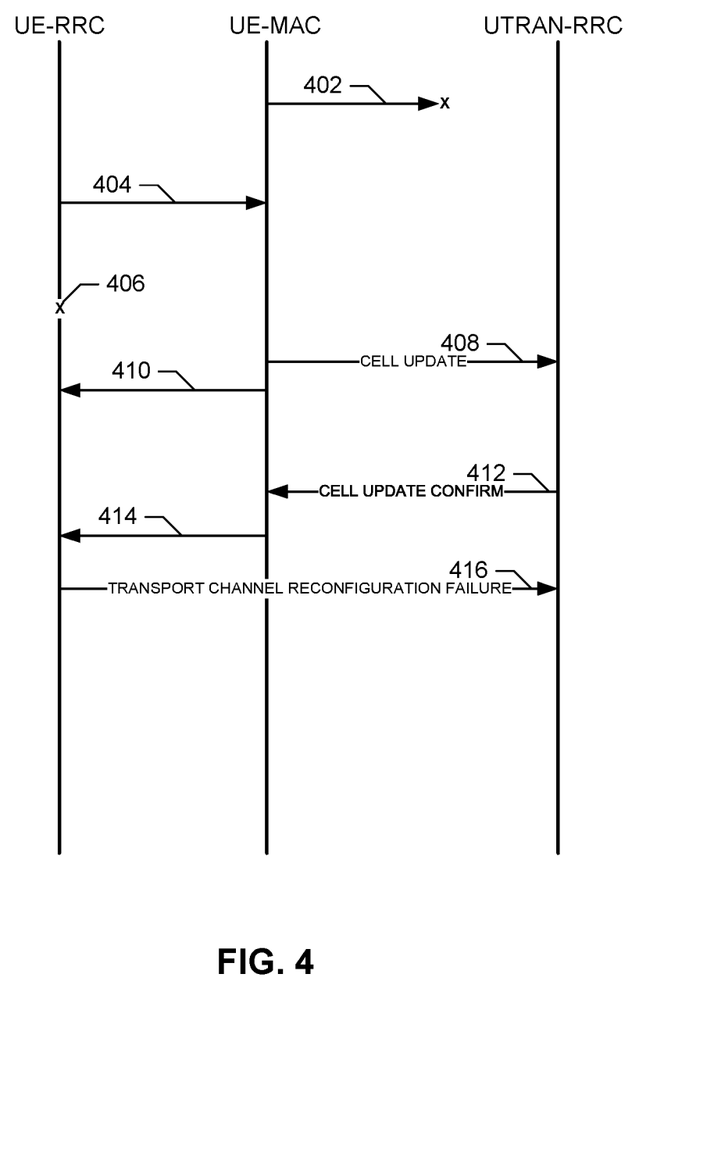

FIG. 4 is another message diagram illustrating another example process to recover from radio link failure. The message diagram begins when a radio link failure is detected when the MAC of the UE transmits message 402. For example, the radio link failure may be detected in accordance with 3GPP TS 25.331 section 8.5.6. The UE then initiates a CELL UPDATE procedure. For example, the UE may initiate a CELL UPDATE procedure as described in 3GPP TS 25.331 section 8.3.1. Initiation of the CELL UPDATE procedure may trigger the start of the T314. While the T314 timer is referenced in conjunction with FIG. 4, the T315 timer may additionally or alternatively be utilized.

When compilation of the CELL UPDATE message has completed, the RRC of the UE transmits 404 the CELL UPDATE message to the MAC for transmission to the network (e.g., UTRAN in the illustrated example). According to the illustrated example, at 406 the T314 timer expires and the UE releases all RBs/signalling connections associated with the T314 timer. Meanwhile, the MAC transmits 408 the CELL UPDATE to the UTRAN. In response to the transmission 408, the MAC of the UE indicates 410 to the RRC of the UE the successful transmission of the CELL UPDATE message. In response to the indication 410, the RRC starts the T302 timer.

In response to the CELL UPDATE, the network transmits 412 a CELL UPDATE CONFIRM message to the MAC of the UE. The MAC transmits 414 the CELL UPDATE CONFIRM to the RRC of then UE. The recovery module 148 of the UE examines the contents of the CELL UPDATE CONFIRM message. In response to detecting that the UTRAN is trying to re-establish a call and that the contents of the CELL UPDATE CONFIRM are not sufficient to enable the UE to re-establish the call (e.g., because there are no transport channel mappings in the message), the UE performs the following:

After determining that the network is sending the CELL UPDATE CONFIRM message to try to re-establish a call for which there are no transport channel mappings in the message, the UE transmits 416 an RRC Reconfiguration Failure message to notify the network that radio bearers identified in the CELL UPDATE CONFIRM are unavailable (e.g., a TRANSPORT CHANNEL RECONFIGURATION FAILURE message in the illustrated example) with an indication that the current configuration is invalid (e.g., a cause value set to "Invalid Configuration," a cause value set to "Configuration Unsupported," etc.) to the UTRAN. Thus, the UTRAN is notified that the configuration is invalid and an alternative re-establishment procedure is to be utilized. The UTRAN can then take appropriate action to re-establish a connection.

While the illustrated example indicates that the transmission 416 is a TRANSPORT CHANNEL RECONFIGURATION FAILURE message, other messages could be transmitted. For example, the transmission 416 could be a RADIO BEARER SETUP FAILURE message, a RADIO BEARER RECONFIGURATION FAILURE message, a RADIO BEARER RELEASE FAILURE message, a PHYSICAL CHANNEL RECONFIGURATION FAILURE message, etc.

Figure 5:
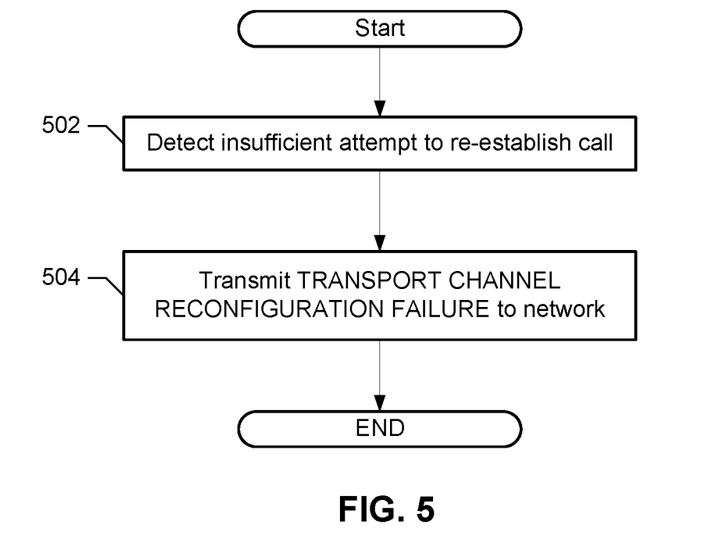

FIG. 5 is another flowchart of example instructions to implement the recovery module 148 to recover a connection in accordance with the message diagram of FIG. 4. The example process begins when the recovery module 148 detects an insufficient attempt to re-establish a call (block 502). For example, the detection may be performed following the transmissions 402-414 in FIG. 4 by examining the contents of a cell update confirmation message (e.g., the CELL UPDATE CONFIRM message) as described in conjunction with FIG. 4.

The recovery module 148 then causes the UE to transmit a RRC Reconfiguration Failure message with an indication of an invalid configuration or unsupported configuration in order to notify the network that radio bearers identified in the cell update confirmation message are unavailable, such as the TRANSPORT CHANNEL RECONFIGURATION FAILURE message illustrated in FIG. 4 (block 504). The process of FIG. 5 then ends. For example, any process for re-establishing a call after RBs/signalling connections have been released may be used.

In some examples, the recovery module 148 may cause transmission of a subsequent CELL UPDATE message after detecting the insufficient attempt by the network to reestablish the call by the CELL UPDATE CONFIRM message. For example, the subsequent CELL UPDATE message a variable for a timer may be set as expired. For example, the recovery module 148 may set the IE "T314-expired" as TRUE in the IE "RB Timer Indicator" of the CELL UPDATE message to indicate to the UTRAN that the UE has cleared the RBs/signalling connections associated with the expired re-establishment timer T314. Alternatively, the recovery module 148 may cause transmission of the subsequent CELL UPDATE message with an indication of an invalid configuration. For example, the recovery module 148 may set the IE "Failure cause" to "invalid configuration" in the subsequent CELL UPDATE message. In another example, the recovery module 148 could set both the timer expiration and the invalid configuration indications in a CELL UPDATE message.

In an alternative to FIG. 5, in response to detecting the insufficient attempt to re-establish the call (block 502), the recovery module 148 causes the UE to release the RRC Connection and enter IDLE mode. For example, the UE may enter IDLE mode in accordance with 3GPP TS 25.331 section 8.5.2). The recovery module 148 causes the UE to not respond (i.e., prevents the UE from responding) to the CELL UPDATE CONFIRM thereby preventing a race condition and allowing the UE and the network to re-establish the connection from scratch.

Figure 6:
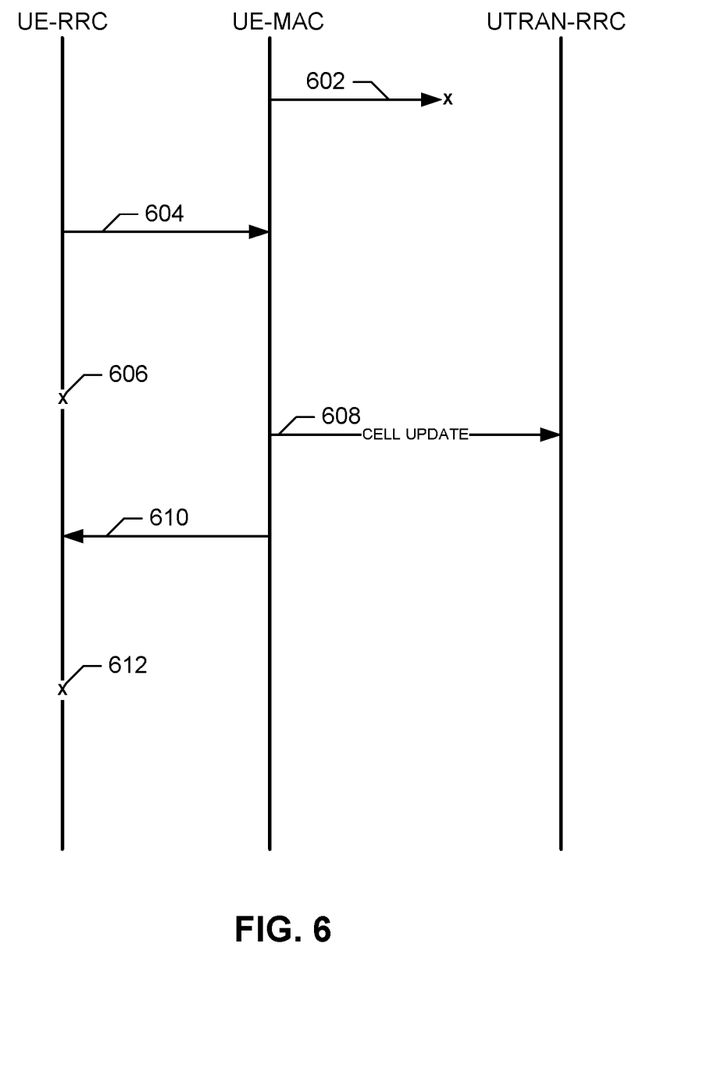

FIG. 6 is another message diagram illustrating an example process to recover from radio link failure. The message diagram begins when a radio link failure is detected when the MAC of the UE transmits message 602. For example, the radio link failure may be detected in accordance with 3GPP TS 25.331 section 8.5.6. The UE then initiates a CELL UPDATE procedure. For example, the UE may initiate a CELL UPDATE procedure as described in 3GPP TS 25.331 section 8.3.1. Initiation of the CELL UPDATE procedure may trigger the start of the T314. While the T314 timer is referenced in conjunction with FIG. 6, the T315 timer may additionally or alternatively be utilized.

When compilation of the CELL UPDATE message has completed, the RRC of the UE transmits 604 the CELL UPDATE message to the MAC for transmission to the network (e.g., UTRAN in the illustrated example). According to the illustrated example, the recovery module 148 causes the UE to initiate the T302 timer (i.e., instead of waiting for the MAC to notify the RRC of the successful transmission of the CELL UPDATE).

According to the illustrated example, at 606 the T314 timer expires. However, unlike the operation in FIGS. 2-5, because the T302 timer is still running the UE continues waiting for a response to the CELL UPDATE message before taking action regarding the RBs/signalling connections associated with the expired timer. Meanwhile, the MAC of the UE transmits 608 the CELL UPDATE to the UTRAN. In response to the transmission 608, the MAC indicates 610 to the RRC of the UE the successful transmission of the CELL UPDATE message. Because the T302 timer is already running, the RRC does not start the T302 timer at this point.

According to the illustrated example, at 612 the timer T302 expires and the RRC processes the expiration. For example, the RRC may process the expiration in accordance with 3GPP TS25.331 sections 8.3.1.12 and 8.3.1.13 by releasing the RBs/signalling connections associated with the T314 timer and going to an IDLE mode.

Figure 7:
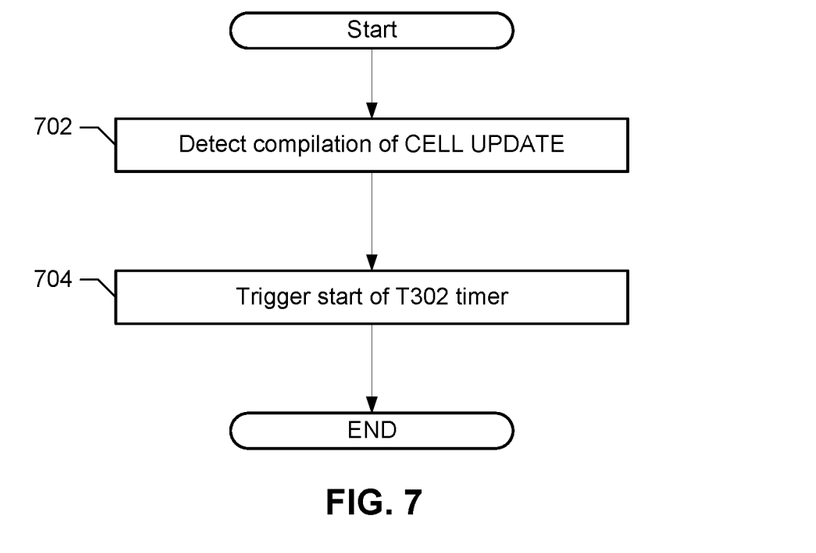

FIG. 7 is another flowchart of example instructions to implement the recovery module 148 to recover a connection in accordance with the message diagram of FIG. 6. The example process begins when the recovery module 148 detects that, in a radio link failure process, compilation of a CELL UPDATE message has completed (block 702). For example, the recovery module 148 may detect that the RRC of a UE has transmitted the CELL UPDATE message to the MAC layer of the UE.

The recovery module 148 then causes the UE to initiate a CELL UPDATE timer (e.g., the T302 timer) (block 704). The process of FIG. 7 then ends. For example, as illustrated in the message diagram of FIG. 6, the UE continues processing the recovery awaiting the expiration of the T302 timer.

Figure 8:
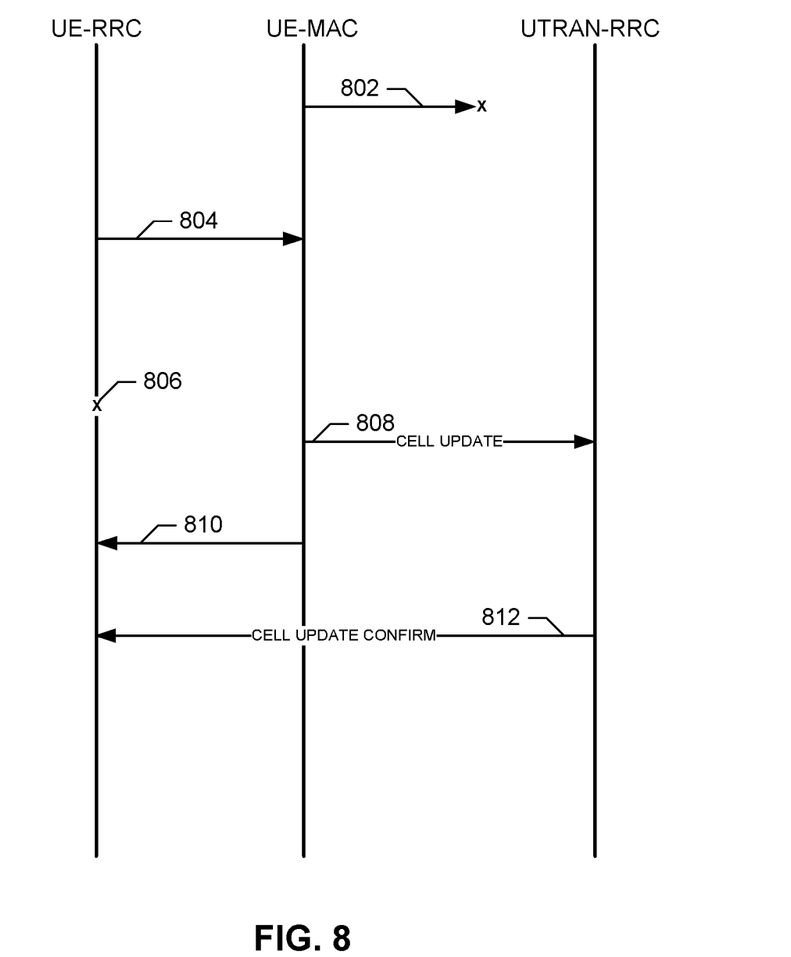

FIG. 8 is another message diagram illustrating an example process to recover from radio link failure. The message diagram begins when a radio link failure is detected when the MAC of the UE transmits message 802. For example, the radio link failure may be detected in accordance with 3GPP TS 25.331 section 8.5.6. The UE then initiates a CELL UPDATE procedure. For example, the UE may initiate a CELL UPDATE procedure as described in 3GPP TS 25.331 section 8.3.1. Initiation of the CELL UPDATE procedure may trigger the start of the T314. While the T314 timer is referenced in conjunction with FIG. 8, the T315 timer may additionally or alternatively be utilized.

When compilation of the CELL UPDATE message has completed, the RRC of the UE transmits 804 the CELL UPDATE message to the MAC for transmission to the network (e.g., UTRAN in the illustrated example). According to the illustrated example, at 806 the T314 timer expires. However, according to the illustrated example, the recovery module 148 prevents release of the RBs/signalling connections associated with the T314 timer. In other words, the recovery module 148 causes the UE to act as though the T302 timer is running. Meanwhile, the MAC of the UE transmits 808 the CELL UPDATE to the UTRAN. In response to the transmission 808, the MAC indicates 810 to the RRC of the UE the successful transmission of the CELL UPDATE message. In response to the indication 810, the RRC starts the T302 timer.

In response to the CELL UPDATE, the network transmits 812 a CELL UPDATE CONFIRM message to the UE. Because the recovery module 148 prevented the release of the RBs/signalling connections, the CELL UPDATE CONFIRM is able to re-establish the call using those RBs/signalling connections. If, however, the T302 timer expires prior to receipt of the CELL UPDATE CONFIRM message, the UE will release the RBs/signalling connections associated with the T314 timer.

Figure 9:
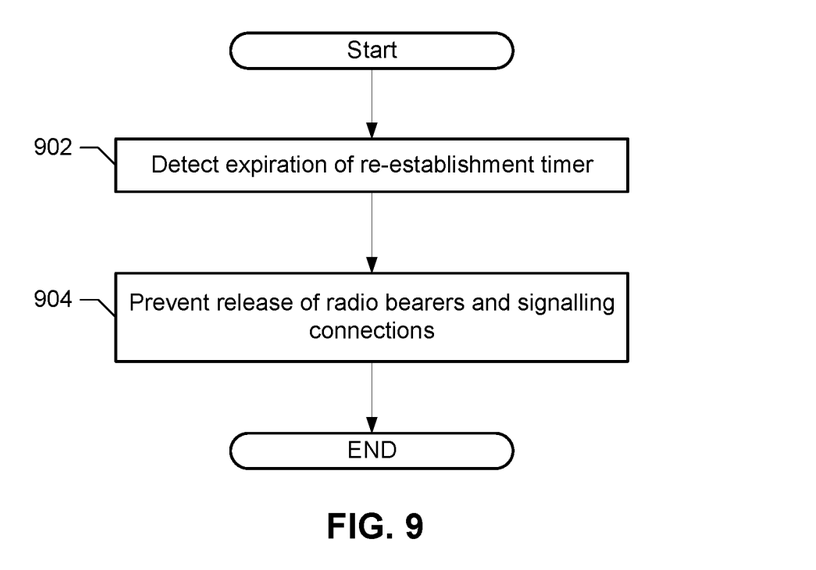

FIG. 9 is a flowchart of example instructions to implement the recovery module 148 to recover a connection in accordance with the message diagram of FIG. 8. The example process begins when the recovery module 148 detects expiration of a re-establishment timer (e.g., the T314 timer) (block 902). In response to detecting the expiration, the recovery module 148 prevents the RRC from releasing RBs/signalling connections associated with the expired timer (block 904). For example, the recovery module 148 may prevent the RBs/signalling connections from being released until after a CELL UPDATE timer (e.g., the T302 timer) has been started and has expired. The process of FIG. 9 then ends. For example, as illustrated in the message diagram of FIG. 8, the UE continues processing the recovery awaiting the response to the CELL UPDATE (e.g., the CELL UPDATE CONFIRM).

In some examples based on FIGS. 6-9, expiration of the re-establishment timer may be communicated to the network in a subsequent CELL UPDATE message (e.g., a subsequent CELL UPDATE message transmitted after a CELL UPDATE message as described in conjunction with FIGS. 6-11). For example, the IE "RB Timer Indicator" may include an indication of TRUE for the expiry of the timer T314 and/or the timer T315.

Figure 10:
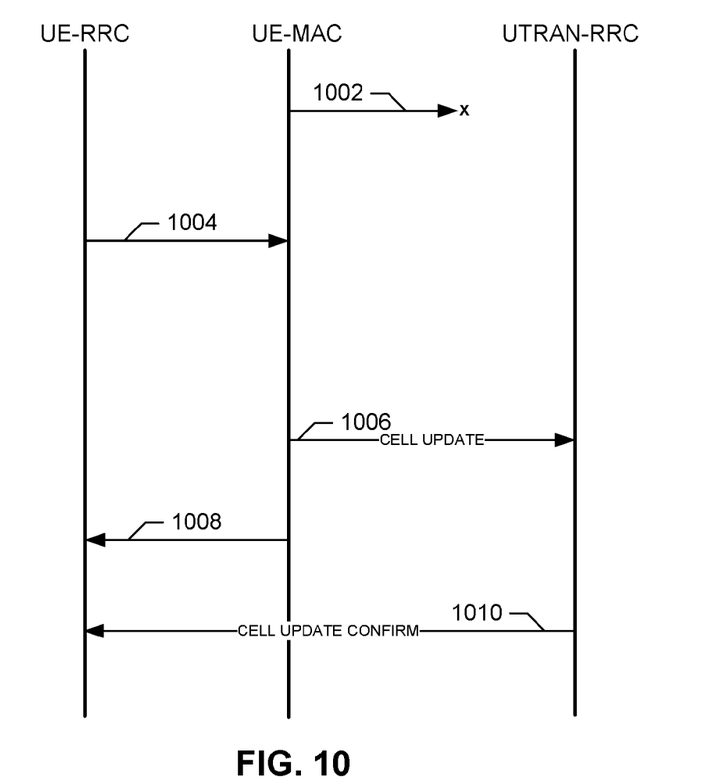

FIG. 10 is another message diagram illustrating an example process to recover from radio link failure. The message diagram begins when a radio link failure is detected when the MAC of the UE transmits message 1002. For example, the radio link failure may be detected in accordance with 3GPP TS 25.331 section 8.5.6. The UE then initiates a CELL UPDATE procedure. For example, the UE may initiate a CELL UPDATE procedure as described in 3GPP TS 25.331 section 8.3.1.

When compilation of the CELL UPDATE message has completed, the RRC of the UE transmits 1004 the CELL UPDATE message to the MAC for transmission to the network (e.g., UTRAN in the illustrated example). MAC of the UE transmits 1006 the CELL UPDATE to the UTRAN. In response to the transmission 1006, the MAC indicates 1008 to the RRC of the UE the successful transmission of the CELL UPDATE message. In response to the indication 1008, the RRC starts the T302 and T314 timer. While the T314 timer is referenced in conjunction with FIG. 10, the T315 timer may additionally or alternatively be utilized.

In response to the CELL UPDATE, the network transmits 1012 a CELL UPDATE CONFIRM message to the UE in order to re-establish the call.

Figure 11:
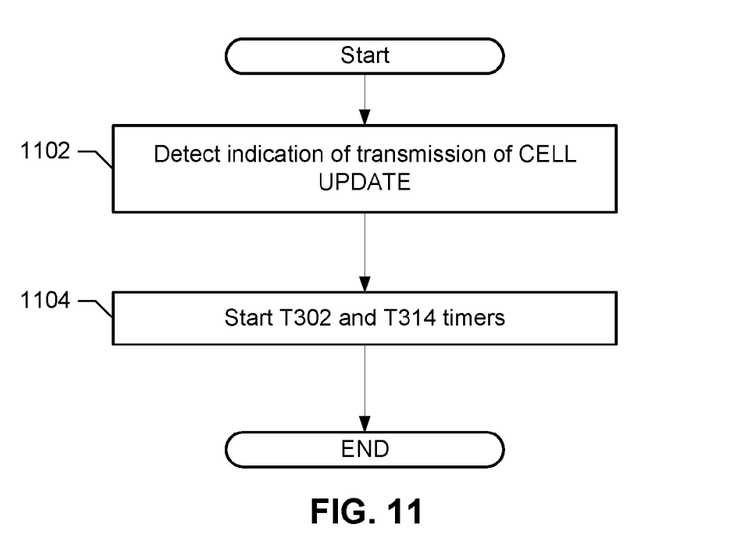

FIG. 11 is a flowchart of example instructions to implement the recovery module 148 to recover a connection in accordance with the message diagram of FIG. 10. The example process begins when the recovery module 148 detects an indication that a CELL UPDATE message has been successfully transmitted (e.g., message 1008 of FIG. 10) (block 1102). In response to the indication, the recovery module 148 causes initiation of a re-establishment timer (e.g., the T314 timer) and a CELL UPDATE timer (e.g., the T302 timer) (block 1104). The process of FIG. 11 then ends. For example, as illustrated in the message diagram of FIG. 10, the UE continues processing the recovery awaiting the response to the CELL UPDATE (e.g., the CELL UPDATE CONFIRM). Initiating the T314 and T302 timers after the CELL UPDATE has been successfully transmitted may, for example, ensure that the T314 timer does not expire before the T302 timer has been initiated.

While the foregoing describes an example block diagram implementation of the mobile device 100 and processes to implement the recovery module 148, other implementations are possible. For example, additional blocks may be included and additional or different connections between the blocks may exist. While particular names for timers are referenced throughout the specification other timers or timer names may be utilized. For example, other re-establishment and/or transmission timers may be utilized. For example, the T315 timer may be substituted for the T314 timer in any of the examples described herein.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes that come within the meaning and range of equivalency of the claims are to be embraced within their scope.

What is claimed is:

1. A method comprising:
    detecting, by a user equipment (UE), a radio link failure condition;
    in response to detecting the radio link failure condition, sending by a radio resource control (RRC) of the UE, a cell update message to a medium access control (MAC) of the UE;
    starting a cell update timer of the UE upon sending the cell update message from the RRC of the UE to the MAC of the UE and before receiving, from the MAC, confirmation of transmission of the cell update message by the MAC to a network;
    detecting, by the UE, that a timer associated with a radio access bearer has expired before receiving the confirmation from the MAC; and
    releasing the radio access bearer only in response to expiration of the cell update timer.

2. The method of claim 1, wherein the cell update timer is a timer T302.

3. The method of claim 1, wherein the timer associated with the radio access bearer is different from or distinct from the cell update timer.

4. The method of claim 3, wherein the cell update timer is a timer T302, and wherein the timer associated with the radio access bearer is at least one of a timer T314 or a timer T315.

5. A user equipment (UE) comprising a processor configured to:
    detect a radio link failure condition;
    in response to detection of the radio link failure condition, send by a radio resource control (RRC) of the UE, a cell update message to a medium access control (MAC) of the UE;
    start a cell update timer of the UE upon sending the cell update message from the RRC of the UE to the MAC of the UE and before receiving, from the MAC, confirmation of transmission of the cell update message by the MAC to a network;
    detect, by the UE, that a timer associated with a radio access bearer has expired before receiving the confirmation from the MAC; and
    release the radio access bearer only in response to expiration of the cell update timer.

6. The UE of claim 5, wherein the cell update timer is a timer T302.

7. The UE of claim 5, wherein the timer associated with the radio access bearer is different from or distinct from the cell update timer.

8. The UE of claim 7, wherein the cell update timer is a timer T302, and wherein the timer associated with the radio access bearer is at least one of a timer T314 or a timer T315.

9. A non-transitory computer readable medium storing instructions that, when executed, cause a user equipment (UE) to:

detect a radio link failure condition;

in response to detection of the radio link failure condition, send by a radio resource control (RRC) of the UE, a cell update message to a medium access control (MAC) of the UE;

start a cell update timer of the UE upon sending the cell update message from the RRC of the UE to the MAC of the UE and before receiving, from the MAC, confirmation of transmission of the cell update message by the MAC to a network;

detect, by the UE, that a timer associated with a radio access bearer has expired before receiving the confirmation from the MAC; and release the radio access bearer only in response to expiration of the cell update timer.

10. The non-transitory computer readable medium of claim 9, wherein the cell update timer is a timer T302.

11. The non-transitory computer readable medium of claim 9, wherein the timer associated with the radio access bearer is different from or distinct from the cell update timer.

12. The non-transitory computer readable medium of claim 11, wherein the cell update timer is a timer T302, and wherein the timer associated with the radio access bearer is at least one of a timer T314 or a timer T315.

* * * * *